United States Patent
Huang et al.

(10) Patent No.: US 6,987,905 B2
(45) Date of Patent: Jan. 17, 2006

(54) SIMPLIFIED GAIN FLATTENING AND TAP DEVICE

(75) Inventors: Yonglin Huang, Milpitas, CA (US); Jian Liu, Sunnyvale, CA (US); Qi Deng, Cuperino, CA (US); Liren Du, San Jose, CA (US); Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 120 days.

(21) Appl. No.: 10/725,804

(22) Filed: Dec. 2, 2003

(65) Prior Publication Data

US 2004/0165819 A1 Aug. 26, 2004

Related U.S. Application Data

(60) Provisional application No. 60/430,479, filed on Dec. 2, 2002.

(51) Int. Cl.
*G02B 6/26* (2006.01)

(52) U.S. Cl. .............................. 385/27; 385/33; 372/45
(58) Field of Classification Search .................. 385/15, 385/27, 31, 33, 39; 372/45, 46, 101; 362/293
See application file for complete search history.

(56) References Cited

U.S. PATENT DOCUMENTS

| | | | |
|---|---|---|---|
| 6,879,744 B2 * | 4/2005 | Atanasov | 385/15 |
| 2004/0090783 A1 * | 5/2004 | Chang et al. | 362/293 |

* cited by examiner

Primary Examiner—Phan T. H. Palmer
(74) Attorney, Agent, or Firm—Workman Nydegger

(57) ABSTRACT

A gain flattening and tap device. A gain flattening filter for use in fiber-optic communications includes a substrate. A GFF film is formed on a first surface of the substrate. An HR film is formed on a second surface of the substrate. The HR film is arranged to receive light from the GFF film and to reflect at least some of the light back through the GFF film. By passing the light through the GFF film multiple times, the effectiveness of the GFF film is multiplied. Further, by constructing the HR film to allow portions of the light to pass through, a tap may be implemented with the GFF.

28 Claims, 2 Drawing Sheets

100# SIMPLIFIED GAIN FLATTENING AND TAP DEVICE

CROSS-REFERENCE TO RELATED APPLICATIONS

This application claims priority to and the benefit of U.S. Provisional Patent Application No. 60/430,479, filed Dec. 2, 2002, entitled SIMPLIFIED GAIN FLATTENING AND TAP DEVICE FOR ADVANCED EDFA; which is hereby incorporated by reference in its entirety.

BACKGROUND OF THE INVENTION

1. The Field of the Invention

The invention generally relates to the field of fiber optic communications. More specifically, the invention relates to gain flattening filters for equalizing gain from an amplifier in an optical system.

2. The Relevant Technology

In the field of data transmission, one method of efficiently transporting data is through the use of fiber-optics. Digital data is propagated through a fiber-optic cable using light emitting diodes or lasers. Light signals allow for high transmission rates and high bandwidth capabilities. Also, light signals are resistant to electro-magnetic interferences that would otherwise interfere with electrical signals. Light signals are more secure because they do not allow portions of the signal to escape from the fiber-optic cable as can occur with electronic signals in wire-based systems. Light signals also can be conducted over greater distances without the signal loss typically associated with electronic signals on wire-based systems.

While signal loss in a fiber-optic cable may be less than signal loss in wire-based systems, there is nonetheless some signal loss as light signals are transmitted over fiber-optic networks. Optical amplifiers are used to compensate for the signal loss. Two common optical amplifiers are Raman amplifiers and Erbium Doped Fiber Amplifiers (EDFAs). Both of these amplifiers use characteristics of doped fiber-optic cables to amplify light signals.

The amplifier pumps light onto the fiber-optic cable. The pumped light is at a different frequency than the light signal that is to be amplified. As the light signal and pumped light travel along the fiber-optic cable, energy from the pumped light is transferred to the light signal. Optical amplifiers use optical pumps, i.e. laser sources, to generate the pumped light.

In some fiber-optic applications, the light signals being transmitted may include different wavelengths of light. Each wavelength may be referred to as a channel. For example, the C-band might be used to transmit 40 different channels or wavelengths along the 1530 to 1562 nm bandwidth. In a variety of optical applications, it is desirable to amplify each channel with about the same optical gain. However, the optical gain of an optical gain medium, such as the doped fiber-optic cables, depends upon wavelength. In other words, optical amplifiers like Raman amplifiers and EDFAs, do not provide the same amount of optical gain to each channel in the light signals and some wavelength channels experience greater amplification than other channels. Consequently, a single gain medium does not usually function as a high gain medium having substantially uniform optical gain over an extended wavelength range.

Conventional approaches to providing uniform optical gain over an extended wavelength range typically have more components than desired, require significant numbers of optical interconnects resulting in insertion losses, and typically cost more than desired. Illustratively, EDFAs are widely used to amplify optical signals to compensate for transmission losses and insertion losses caused, for example by interconnection of components. The gain characteristics of EDFAs are a strong function of optical wavelength. Therefore, to achieve substantially uniform optical gain over an extended wavelength range, an additional gain equalization filter (GEF) he is needed in addition to the EDFA. In a single stage optical amplifier, GEFs are commonly placed after the final stage of the amplifier. For multi-stage amplifiers, GEFs are sometimes placed between amplifier stages. Each GEF introduces an additional component cost, component size, and requires appropriate packaging to permit it to be optically coupled to other components. Further, physically coupling components together results in some degree of insertion loss for each physical connection.

One type of GEF is based on a thin film having a wavelength sensitive transmission curve G(f). Once an incoming beam I(f) passes through the filter, the out-coming beam O(f) can be described as:

$$O(f)=G(f)*I(f) \tag{1}$$

The requirement of GEF transmission dynamics, or the amount of the variation in gain among the frequencies being equalized, depends on the application. In some cases, a wide dynamic range (e.g., more than 10 dB) is required to ensure that the game of each channel is equalized. This can make the GEF filter difficult to make and expensive.

BRIEF SUMMARY OF THE INVENTION

One embodiment of the invention includes a gain flattening filter (GFF) for use in fiber-optic communications. The GFF includes a substrate. The substrate has a GFF film on a first surface of the substrate. A high reflection (HR) film is disposed on a second surface of the substrate. The HR film is arranged to receive a light signal from the GFF film and to reflect a least a portion of a light signal back through the GFF film.

Another embodiment of the invention includes a method of manufacturing a fiber-optic component that includes a gain flattening filter. The method includes forming a GFF film on a first surface of an optical substrate. The method further includes forming an HR film on a second surface of the optical substrate. Forming an HR film on a second surface includes arranging the HR film so the HR film is configured to receive light that is passed through the GFF and to reflect a least a portion of the light back to the GFF film.

Yet another embodiment of the invention includes a method for equalizing non-uniform gain in an optical signal. The method includes passing a light signal through a GFF film. The method further includes passing the light signal from the GFF film through a substrate to an HR film. The method further includes reflecting the light signal at the HR film back through the GFF film. The method further includes directing the reflected light signal into an output port.

Advantageously, embodiments of the invention allow for using a GFF film with reduced performance characteristics such as reduced dynamic range. A single GFF film with reduced performance characteristics may be used because by passing a light signal through the GFF film multiple times allows the effect of the GFF film to be multiplied.

Embodiments of the invention may also allow for the implementation of a combination GFF/tap. By using an HR film that allows a portion of an optical signal to pass through the HR film, an optical signal can be effectively tapped for analyzing the optical signal or for extracting optical channels comprised of the optical signal.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Some embodiments of the present invention implement a gain flattening filter (GFF) that equalizes, or substantially equalizes gain across a bandwidth of frequencies. This may be useful to compensate for unequal gain that is caused by Erbium Doped Fiber Amplifiers (EDFAs), Raman amplifiers and the like. The GFF uses an optical film filter on one side of a substrate. A high reflection (HR) film is used on the other side of the substrate. The GFF functions by an optical signal being passed through the optical film filter, reflected off the HR film and passed through the optical film filter again, effectively multiplying the effectiveness of the optical film filter so as to reduce the complexity and cost of the GFF film. In one embodiment of the invention, the GFF also incorporates an optical tap for either extracting a single wavelength of the optical signal, or for extracting a portion of the power of the optical signal. This may be implemented by using an HR film that allows a single wavelength or group of wavelengths to pass through the HR film.

Figure 1A:
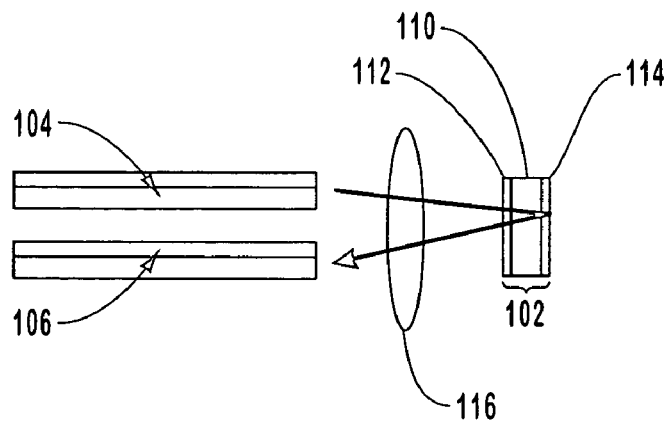
FIG. 1A illustrates one embodiment of a GFF.

FIG. 1A illustrates one embodiment of a GFF 102 disposed in a typical operating environment. The GFF 102 is optically coupled to an input port 104 and an output port 106. In one embodiment of the invention, the input port 104 may be a portion of an EDFA or other amplifier device. In another embodiment of the invention, the GFF 102 may be designed to pre-compensate for an optical amplifier located at, or after the output port 106. In either case, the GFF is configured to attenuate gain at certain wavelengths so as to cause the gain across all wavelengths to be substantially uniform.

The GFF 102 includes a substrate 110. The substrate 110 is optically transparent for wavelengths of light used with the GFF 102 in this embodiment. One surface 111 of the substrate 110 is coated with a GFF film 112. The GFF film 112 is designed to equalize gain by attenuating certain wavelengths of light. An opposing surface 113 of the substrate 110 is coated with an HR film 114. The light beam coming from the input port is collimated or focused by a first lens 116. The collimated beam passes through the GFF film 112, the substrate 110 and is reflected by the HR film 114. This reflected light once again passes through the substrate 110, the GFF film 112 and is launched by the first lens 116 into the output port 106. The beam launched into the output port 106 can be described as:

$$O(f)=I(f)*G(f)*HR(f)*G'(f) \qquad (2).$$

In equation (2), O(f) is the beam launched into the output port as a function of frequency. I(f) describes the beam from the input port 104 as a function of frequency. G(f) is the frequency response of the GFF film 112 for light traveling through the GFF film 112 towards the substrate 110. HR(f) is the frequency response of the HR film 114 as is relates to light that is reflected off of the HR film 114. G'(f) is the frequency response of the GFF film 112 for light traveling through the GFF film 112 away from the substrate 110. By using an HR film 114, the effect of the GFF film 112 is the combined frequency response of G(f)*G'(f). This allows for the use of GFF films with narrower dynamic ranges to achieve an adequate equalizing effect.

Figure 1B:
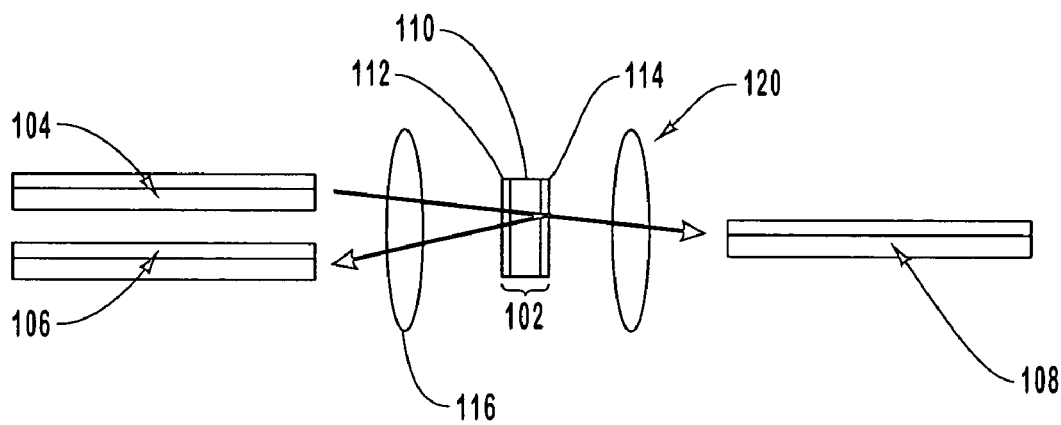
FIG. 1B illustrates one embodiment of a GFF with a tap function with tapped light being directed into a tap port.

In another embodiment shown in FIG. 1B, the HR film 114 is configured to allow one or more wavelengths of light or a percentage of one or more wavelengths of light to pass through the HR film to a tap port 108. Light passing through the tap port 108 is focused or collimated by a second lens 120 such that the light is launched into the tap port 108. In this way, a tap and GFF can be implemented in a simple cost effective way. The signal T(f) output to the tap port 108 can be described as:

$$T(f)=I(f)*G(f)*[1-HR(f)].$$

The signal launched into the tap port 108 may be used for network analysis such as for example when the HR film 114 is designed to allow a percentage of one or more wavelengths of light to pass through. Alternatively, the GFF 102 may be used as the drop portion of an optical add drop module for extracting a particular wavelength of light that includes data in a channel needed by a device in an optical network.

Figure 1C:
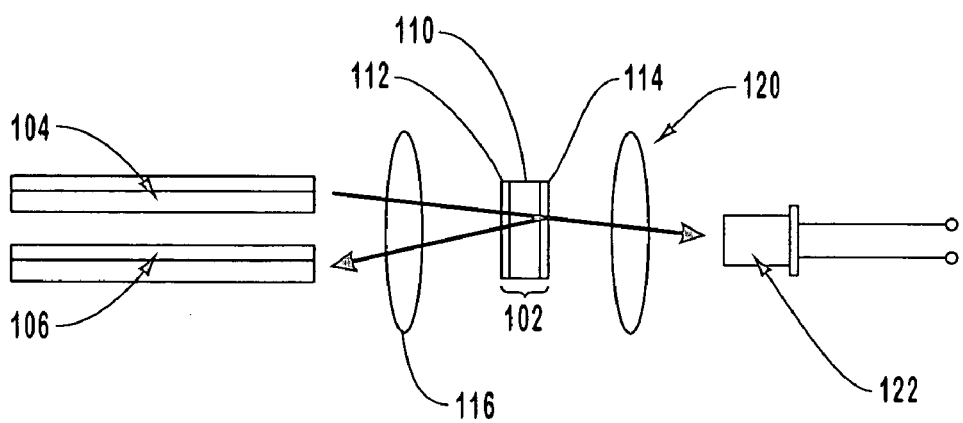
FIG. 1C illustrates one embodiment of a GFF with a tap function with tapped light being directed into a photodiode.

Another embodiment is illustrated in FIG. 1C. FIG. 1C shows a photodiode 122 arranged to receive an optical signal passed through the HR film 114. Using a photodiode 122 allows the GFF 102 to be implemented in an optical transceiver or other optical component that has a need to convert an optical signal to an electronic signal.

Advantageously, in one embodiment of the invention, the GFF film requirements are relaxed as compared to other GFF filters. As discussed earlier, some optical amplifier designs require a GFF filter with a dynamic range of up to 10 dB. This can make the GFF difficult to fabricate and expensive. By reflecting the input beam, the beam passes through the GFF filter 112 twice. In an embodiment of the invention where the frequency response G(f) of the GFF filter for light traveling towards the substrate 110 is the same as the frequency response G'(f) for light traveling away from the substrate 110, the GFF filter would only need to have a 5 dB dynamic range. The difficulty of fabricating and the cost of the filter are therefore reduced.

Figure 1D:
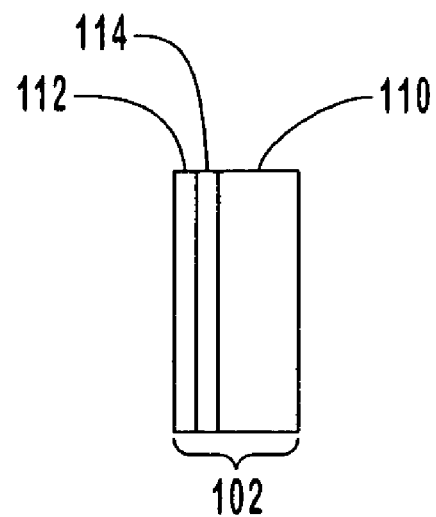
FIG. 1D illustrates another embodiment of a GFF.

Other configurations may also be implemented within the scope of the embodiments of the present invention. For example, referring to FIG. 1D, a GFF filter 102 includes the HR film 114 disposed on the optical substrate 110. The GFF film 112 is disposed on the HR film 114. This configuration allows the GFF film to be used twice to flatten gain as light signals are reflected off of the HR film 114.

Figure 1E:
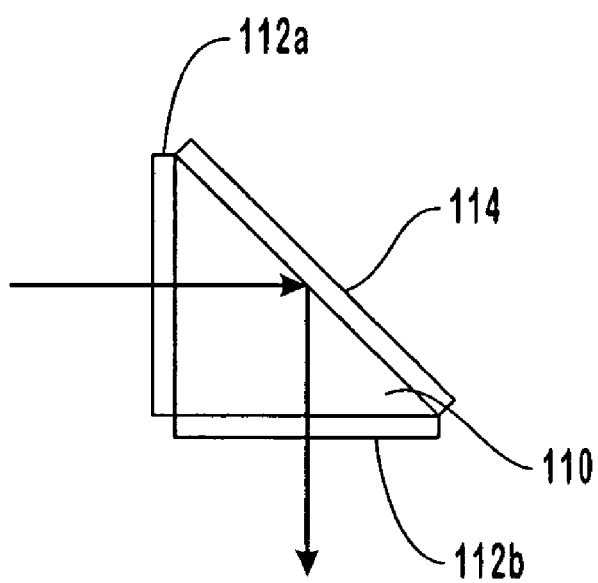
FIG. 1E illustrates yet another example of a GFF having multiple films.

FIG. 1E illustrates an embodiment where multiple GFF films with lower dynamic ranges may be used. A first GFF film 112a is disposed on the optical substrate 110. The first GFF film 112a flattens gain as light passes through the first GFF film. An HR film 114 is positioned so as to reflect a light signal from the first GFF film 112a to a second GFF film 112b. The second GFF film 112b further flattens gain. Using this configuration, although two GFF films are used, the GFF films may have a lower dynamic range. The GFF films may have similar or different optical characteristics within the scope of various embodiments of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A gain flattening filter for use in fiber optic communications, the gain flattening filter comprising:
    a substrate having a first surface and a second surface;
    a first film disposed on the first surface of the substrate, the first film configured to attenuate one or more channels in a light signal; and
    a second film disposed on the second surface of the substrate, the second film arranged to receive the light signal from the first film and to reflect at least a portion of the light signal back through the first film that attenuates the one or more channels a second time.

2. The gain flattening filter of claim 1 wherein the second film is a high reflection (HR) film.

3. The gain flattening filter of claim 2 wherein the HR film is adapted to allow one or more wavelengths of light to pass through the HR film.

4. The gain flattening filter of claim 2 wherein the HR film is adapted to allow a percentage of the light signal to pass through the HR film.

5. The gain flattening filter of claim 1 wherein the first film is a gain flattening filter (GFF) film.

6. A gain flattening filter for use in fiber optic communications, the gain flattening filter comprising:
    a substrate having a first surface and a second surface;
    a first film disposed on the first surface of the substrate, the first film configured to attenuate one or more channels in a light signal;
    an second film disposed on the second surface of the substrate, the second film arranged to receive the light signal from the first film and to reflect at least a portion of the light signal back through the first film, that attenuates the one or more channels;
    an input port adapted to direct an input light signal into the gain flattening filter; and
    an output port adapted to receive an output light signal reflected by the second film.

7. The fiber optic component of claim 6, further comprising a first lens configured to direct the input light signal from the input port to the gain flattening filter.

8. The fiber optic component of claim 6, the HR film configured to allow a portion of the input signal to pass through the HR film, the fiber optic component further comprising:
    a tap port optically coupled to the HR film and adapted to receive the portion of the input signal; and
    a second lens adapted to launch the portion of the input signal into the output port.

9. The fiber optic component of claim 6, the input port comprising at least a portion of an optical amplifier.

10. The fiber optic component of claim 6, the output port comprising at least a portion of an optical amplifier.

11. The fiber optic component of claim 6, the HR film configured to allow a portion of the input signal to pass through the HR film, the fiber optic component further comprising a photodiode optically coupled to the HR film and adapted to receive the portion of the input signal and to produce an electronic signal in response to receiving the portion of the input signal.

12. A method of manufacturing a fiber optic component that includes a gain flattening filter, the method comprising:
    forming a GFF film on a first surface of an optical substrate; and
    forming an HR film on a second surface of an optical substrate, wherein forming an HR film on a second surface comprises arranging the HR film so that the HR film is configured to receive light that has pass through the GFF film and to reflect at least a portion of the light back to the GFF film.

13. The method of claim 12, further comprising:
    optically coupling an input port to the GFF film, the input port configured to direct light into the GFF film; and
    optically coupling an output port to the GFF film, the output port configured to receive light reflected from the HR film through the GFF film.

14. The method of claim 12, wherein the HR film is adapted to allow at least a portion of the light to pas through the HR film, the method further comprising optically coupling a tap port to the HR film for receiving the at least a portion of the light.

15. The method of claim 12, wherein the HR film is adapted to allow at least a portion of the light to pass through the HR film, the method further comprising optically coupling a photodiode to the HR film for receiving the at least a portion of the light and producing an electronic signal.

16. A method of equalizing non-uniform gain in an optical signal comprising:
    passing a light signal through GFF film;
    passing the light signal from the GFF film through a substrate to an HR film;
    reflecting the light signal at the HR film back through the GFF film; and
    directing the reflected light signal into an output port.

17. The method of claim 16 further comprising:
    allowing a portion of the light signal to pass through the HR film; and
    directing the portion of the light signal that passes through the HR film into a tap port.

18. The method of claim 16 further comprising:
    allowing a portion of the light signal to pass through the HR film;
    directing the portion of the light signal that passes through the HR film into a photodiode;
    producing an electronic signal in response to the light signal being passed through the HR film into the photodiode.

19. A gain flattening filter for use in fiber optic communications, the gain flattening filter comprising:
    a substrate having a first surface and a second surface;
    a first film disposed on the first surface of the substrate, the first film configured to reflect at least a portion of a light signal; and an second film disposed on the first film, the second film configured to attenuate one or more channels of the light signal.

20. The gain flattening filter of claim 19 wherein the second film is a gain flattening filter (GFF) film.

21. The gain flattening filter of claim 19 wherein the first film is a high reflection (HR) film.

22. The gain flattening filter of claim 21 wherein the HR film is adapted to allow a percentage of the light signal to pass through the HR film.

23. The gain flattening filter of claim 21 wherein the HR film is adapted to allow one or more wavelengths of light to pass through the HR film.

24. A gain flattening filter for use in fiber optic communications, the gain flattening filter comprising:
   a substrate having a first surface, a second surface and a third surface;
   a first film disposed on the first surface of the substrate, the first film configured to attenuate one or more channels in a light signal;
   a second film disposed on the second surface of the substrate, the second film configured to attenuate one or more channels in a light signal; and
   a third film disposed on the third surface of the substrate, the third film arranged to receive the light signal from the first film and to reflect at least a portion of the light to the second film.

25. The gain flattening filter of claim 24 wherein the third film is a high reflection (HR) film.

26. The gain flattening filter of claim 25 wherein the HR film is adapted to allow one or more wavelengths of light to pass through the HR film.

27. The gain flattening filter of claim 25 wherein the HR film is adapted to allow a percentage of the light signal to pass through the HR film.

28. The gain flattening filter of claim 24 wherein the first and second films are gain flattening filter (GFF) films.

* * * * *